(12) United States Patent
Videtich

(10) Patent No.: US 7,570,940 B2
(45) Date of Patent: Aug. 4, 2009

(54) ACQUIRING SERVICE AUTHORIZATION STATUS FROM A MOBILE VEHICLE

(75) Inventor: Matt C. Videtich, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 1716 days.

(21) Appl. No.: 10/136,100

(22) Filed: May 1, 2002

(65) Prior Publication Data

US 2003/0207682 A1  Nov. 6, 2003

(51) Int. Cl.
*H04M 1/66* (2006.01)
(52) U.S. Cl. .................. 455/411; 455/430; 455/3.02; 455/427
(58) Field of Classification Search .............. 455/411, 455/430, 427, 12.1, 3.01, 3.02; 379/265.1, 379/265.11, 265.12, 265.13, 265.14; 386/94, 386/46; 725/1
See application file for complete search history.

(56) References Cited

U.S. PATENT DOCUMENTS 6,151,497 A * 11/2000 Yee et al. .................. 455/430

OTHER PUBLICATIONS

U.S. Appl. No. 10/135,300, filed Apr. 30, 2002, Matt C. Videtich.

* cited by examiner

*Primary Examiner*—Alexander Eisen
*Assistant Examiner*—Wayne Cai

(57) ABSTRACT

The present invention provides a method for determining an authorization status of a satellite broadcast service for a mobile vehicle. A call center receives a request for the authorization status of the satellite broadcast service for the mobile vehicle. The call center sends a request signal to the mobile vehicle. The call center then receives an authorization status signal from the mobile vehicle. The call center then sends the authorization status to the satellite broadcast service.

13 Claims, 2 Drawing Sheets

ACQUIRING SERVICE AUTHORIZATION STATUS FROM A MOBILE VEHICLE

FIELD OF THE INVENTION

This invention relates to satellite broadcast services for mobile vehicles. More particularly, the present invention relates to the use of cellular telematics to determine an authorization status of a satellite broadcast service for a mobile vehicle.

BACKGROUND OF THE INVENTION

Distribution and administration of satellite broadcast services require many processing tasks. Generally recipients of said services are required to purchase a satellite radio receiver, or receiver unit, and often they are required to maintain some sort of subscription payments to keep the satellite radio receiver, and thusly their service, active.

The process of authorizing and de-authorizing a receiver unit is often accomplished through the use of the satellite broadcast service itself. A certain amount of the service's bandwidth may be designated for such administrative tasks as these. As such communication is generally one-way, from the satellite to the receiver unit, there is not an obvious method for acquiring the authorization status of a receiver unit. In order to increase the likelihood that an administrative task is accomplished, the same authorization or de-authorization command is often sent repeatedly.

One method being used to acquire the authorization status of a receiver unit utilizes existing, landline communications. For example, a satellite broadcast service such as DIRECTV may require the unit to be attached to a standard phone line solely for the purpose of acquiring the DIRECTV receiver unit's authorization status.

The difficulties in administering satellite broadcast services are only exacerbated when brought into the mobile vehicle realm. The satellite broadcast service may be forced to send the same administration command twenty times over the course of several days in order to provide a statistical likelihood that the signal was sent during a time that the mobile vehicle was on, the receiver unit was also on and functioning, and the receiver unit was in an area with adequate signal reception to accept the command. This is wasteful of valuable satellite broadcast bandwidth, and also requires that the user alert the satellite broadcast service if an administrative command was not accomplished correctly.

The frequency and complexity of administrating satellite services increases if administrative authorization tasks are required beyond simple activation and deactivation of the service as a whole. The introduction of various basic and premium packages, or the introduction of pay-per-view packages would increase the importance of an improved strategy for acquiring a receiver unit's authorization status.

It would be desirable to provide a satellite broadcast service with an authorization status from a mobile vehicle in a manner that overcomes the above-described disadvantages.

BRIEF SUMMARY OF THE INVENTION

One aspect of the invention presents a method for determining an authorization status of a satellite broadcast service for a mobile vehicle. The call center receives a request from the satellite broadcast service for the authorization status for the mobile vehicle, and sends this request on to the mobile vehicle. When the call center receives the authorization status signal from the mobile vehicle it sends it back to the satellite broadcast service.

Another aspect of the invention presents a computer usable medium including a program for determining an authorization status of a satellite broadcast service for a mobile vehicle. The program receives a request from the satellite broadcast service for the authorization status for the mobile vehicle, and sends this request on to the mobile vehicle. When the program receives the authorization status signal from the mobile vehicle it sends it back to the satellite broadcast service.

Another aspect of the invention presents a system for determining an authorization status of a satellite broadcast service for a mobile vehicle including means for receiving a request from the satellite broadcast service for the authorization status for the mobile vehicle at a call center; means for sending a request signal from the call center to the mobile vehicle; means for receiving an authorization status signal from the mobile vehicle at the call center; and means for sending the authorization status to the satellite broadcast service from the call center.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
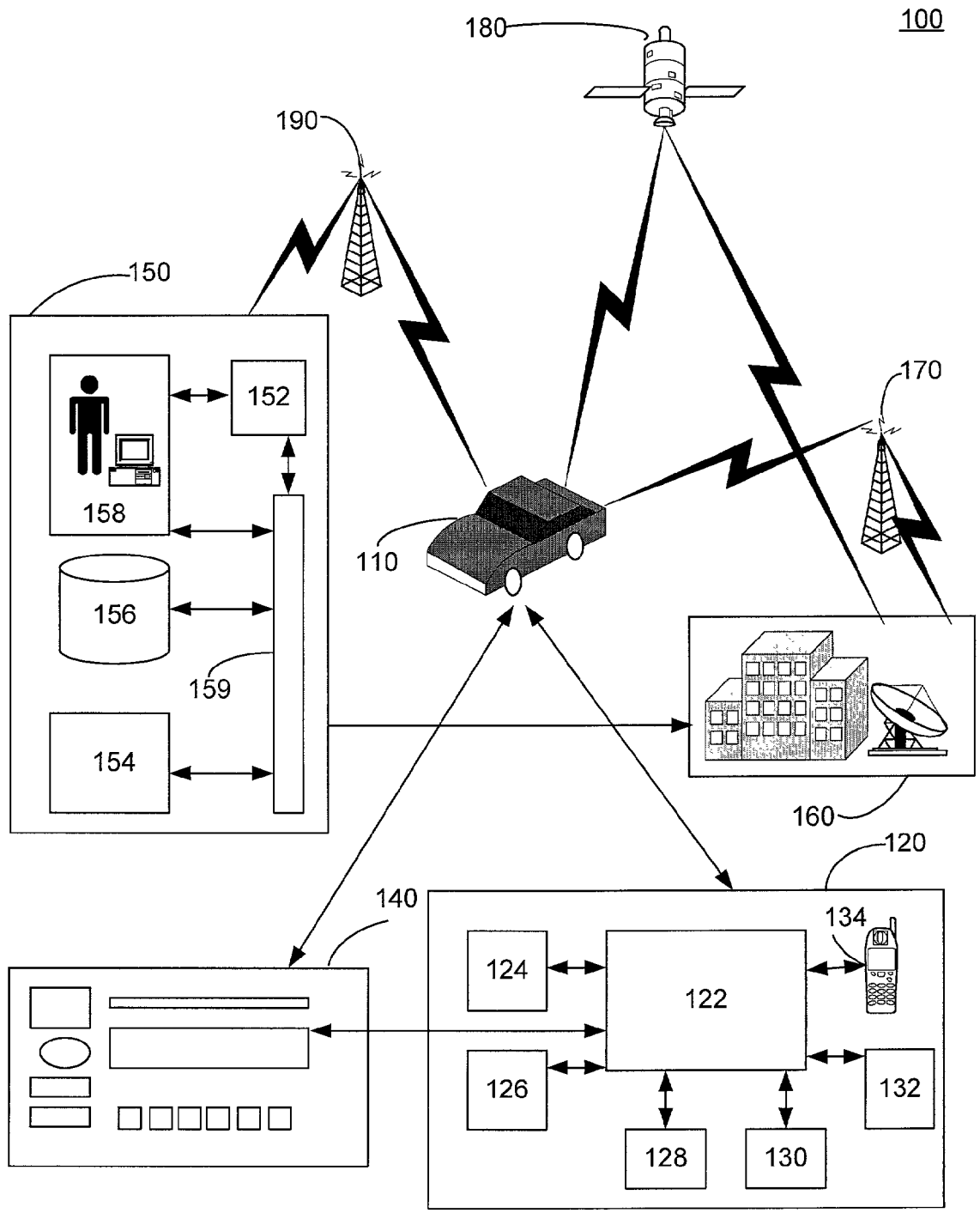
FIG. 1 is a block diagram illustrating one embodiment of a mobile vehicle communication system, in accordance with the present invention.

FIG. 1 illustrates one embodiment of a mobile vehicle communication system, in accordance with the present invention at 100. The invention leverages the infrastructure of an existing wireless carrier based telematics system to determine the authorization status of a satellite broadcast service in a mobile vehicle.

Mobile vehicle communication system 100 may include a mobile vehicle 110, a telematics unit 120, a satellite radio receiver 140, one or more telematics service call centers 150, a cellular phone network, and a wireless carrier system 190, and one or more satellite broadcast services. The satellite broadcast service may include one or more satellite broadcast service ground stations 160, one or more terrestrial radio transmitters 170, and one or more satellite broadcast service geostationary or geosynchronous satellites 180.

Mobile vehicle 110 is a vehicle equipped with suitable hardware and software for transmitting and receiving voice and data communications, as is well known in the art. Mobile vehicle 110 contains telematics unit 120. Telematics unit 120 may include a digital signal processor (DSP) 122 connected to a wireless analog, digital or dual-mode modem 124, a global positioning system (GPS) unit 126, an in-vehicle memory 128, a microphone 130, one or more speakers 132, and a network access device (NAD) or in-vehicle mobile phone 134. In-vehicle mobile phone 134 may be an analog, digital, or dual-mode cellular phone.

DSP 122 uses instructions and data from a computer usable medium that may contain various computer programs for controlling programming and operational modes within mobile vehicle 110. Digital signals are used to activate the programming mode and operation modes, as well as provide input and output data.

Satellite radio receiver 140 is a combination of software and hardware capable of receiving satellite radio broadcast signals in mobile vehicle 110, as is well known in the art. Satellite radio receiver 140 may receive digital signals from one or more terrestrial radio transmitters 170, or from one or more satellite radio service geostationary or geosynchronous satellites 180. Satellite radio receiver 140 includes a radio receiver for receiving broadcast radio information over one or more channels. Satellite radio receiver 140 may be embedded within or connected to telematics unit 120, and provide channel and signal information to telematics unit 120. Telematics unit 120 may monitor, filter and send signals that are received from satellite broadcasts, radio broadcasts or other wireless communication systems to output devices such as speaker 132 and visual display devices.

Telematics service call center 150 is a location where many calls may be received and serviced at the same time, or where many calls may be sent at the same time. The call center facilitates communications to and from mobile vehicle 110. Telematics service call center 150 may be a voice call center, providing verbal communications between an advisor in the call center and a subscriber in a mobile vehicle.

Telematics service call center 150 may contain one or more voice and data switches 152. Switch 152 transmits voice or data transmissions from call center 150. Switch 152 also may receive voice or data transmissions from telematics unit 120 in mobile vehicle 110 through wireless carrier system 140, as is well known in the art. Switch 152 receives and sends data transmissions to and from one or more communication services managers 154 via one or more bus systems 159. Communication services manager 154 is any suitable combination of hardware and software capable of providing requested communication services to telematics unit 120 in mobile vehicle 110. Communication services manager 154 may send to or receive from many different entities including one or more communication services databases 156, one or more communication services advisors 158, all communicating over bus systems 159. Communication services advisor 158 is configured to receive from or send to switch 152 voice or data transmissions.

Terrestrial radio transmitter 170 and satellite broadcast service geostationary or geosynchronous satellite 180 transmit radio signals to satellite radio receiver 140 in mobile vehicle 110. Terrestrial radio transmitter 170 and satellite broadcast service geostationary or geosynchronous satellite 180 may broadcast, for example, over a spectrum in the "S" band (2.3 GHz) that has been allocated by the U.S. Federal Communications Commission (FCC) for nationwide broadcasting of satellite-based Digital Audio Radio Service (DARS). The broadcast may be, for example, a 120 kilobyte-per-second portion of the bandwidth designated for commands signals from telematics service call center 150 to mobile vehicle 110.

Broadcast transmissions provided by a satellite radio broadcast system are sent from geostationary or geosynchronous satellite 180 or terrestrial radio transmitter 170 to satellite radio receiver 140. In addition to music and entertainment, traffic information, road construction information, advertisements, news and information on local events, a command signal may be sent to satellite radio receiver 140 authorizing it to receive certain transmissions from a satellite broadcast service. Telematics unit 120 is capable of storing or retrieving data relating to the authorization status of a satellite broadcast service by querying satellite radio receiver 140 via a bus connection and an established bus protocol, as is well known in the art.

Wireless carrier system 140 is a wireless communications carrier such as a mobile telephone system. The mobile telephone system may be an analog mobile telephone system operating over a prescribed band nominally at 800 MHz. Alternatively, the mobile telephone system may be a digital mobile telephone system operating over a prescribed band nominally at 800 MHz, 900 MHz, 1900 MHz, or any suitable band capable of carrying mobile communications. Wireless carrier system 140 transmits to and receives signals from mobile vehicle 110. Wireless carrier system 140 may be connected with other communication and landline networks. Telematics service call center 150 may be connected to wireless carrier system 140 with a land-based network, a wireless network, or a combination of landline and wireless networks. In this manner, fully duplex communication is achieved between telematics service call center 150 and mobile vehicle 110.

In one example the bus protocol connecting the MVCS 100 and telematics service call center 150 may be a proprietary protocol.

Figure 2:
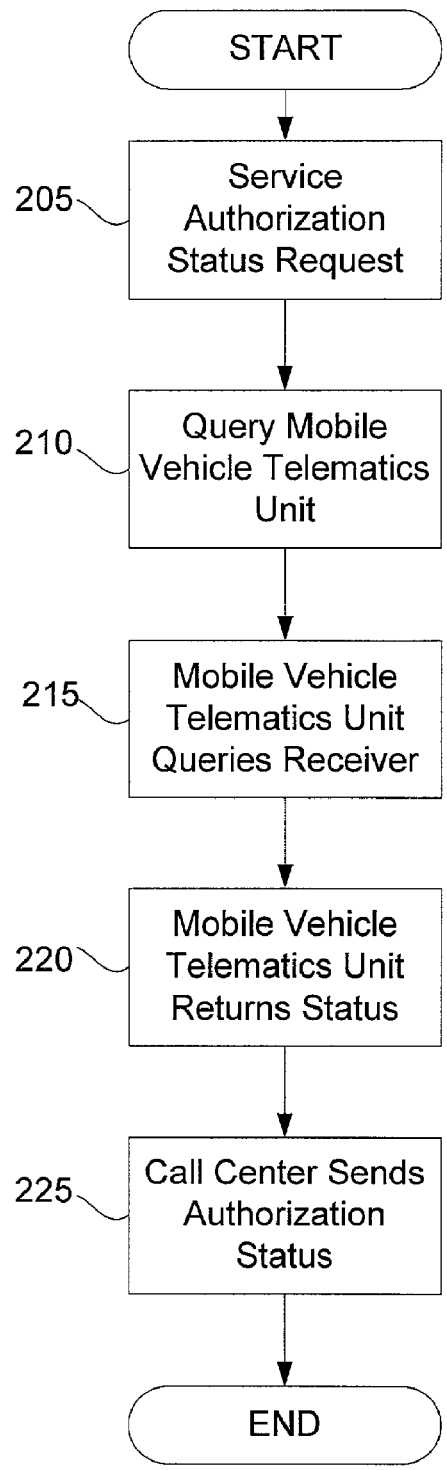
FIG. 2 is a flowchart representation of one embodiment of acquiring the authorization status of a satellite service for a mobile vehicle.

FIG. 2 is a flowchart representation of one embodiment of acquiring an authorization status of a broadcast satellite service for a mobile vehicle at 200. Satellite broadcast service ground station 160 may wish to acquire the authorization status of one of its satellite radio receivers 140 (Block 205) that is connected to telematics unit 120 in mobile vehicle 110. Authorization status may be the activation status of a receiver unit, or alternatively it may indicate a service level, a service package authorization, an authorization to a particular pay-per-view resource, authorization to a particular channel, or any other status pertaining to a satellite broadcast service.

The request for authorization status is transmitted from satellite broadcast service ground station 160 to telematics service call center 150. In one embodiment, the request is sent digitally over a wireless or land-based computer network. In another embodiment, the request for authorization status is made by a human attendant via phone, fax, email, or any other means of person-to-person communication known in the art. In one embodiment, the request for authorization status includes an identifier for satellite radio receiver 140. Telematics service call center 150 searches a database or similar lookup resource to pair the identifier for satellite radio receiver 140 with telematics unit 120 in mobile vehicle 110 accessible by telematics service call center 150 via wireless carrier system 190.

Telematics service call center 150 transmits an authorization status request (Block 210) to telematics unit 120 in mobile vehicle 110. In one embodiment telematics service call center 150 transmits this request via existing wireless carrier system 190. Telematics unit 120 communicates with satellite radio receiver 140 and requests its authorization status (Block 215).

Telematics unit 120 sends the authorization status (Block 220) of satellite radio receiver 140 back to telematics service call center 150, over wireless carrier system 190. Telematics service call center 150 then transmits the authorization status (Block 225) back to satellite broadcast service ground station 160. In one embodiment, telematics service call center 150 may append relevant subscriber information to the authorization status transmission. Relevant subscriber information may include name, address, or other information regarding the user of mobile vehicle 110.

The above-described methods and implementation for acquiring authorization status of a satellite broadcast service for a mobile vehicle are example methods and implementations. These methods and implementations illustrate one possible approach for acquiring authorization status of a satellite broadcast service for a mobile vehicle. Moreover, various other improvements and modifications to this invention may occur to those skilled in the art, and those improvements and modifications will fall within the scope of this invention as set forth below.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for determining an authorization status of a satellite broadcast service for a mobile vehicle, comprising:
   receiving a request from the satellite broadcast service for the authorization status for the mobile vehicle at a call center;
   sending a request signal from the call center to the mobile vehicle;
   receiving an authorization status signal from the mobile vehicle at the call center; and
   sending the authorization status to the satellite broadcast service from the call center.

2. The method of claim 1 wherein the authorization status represents the activation status of as satellite radio receiver in the mobile vehicle.

3. The method of claim 1 further comprising:
   appending subscriber information to the authorization status that is sent to the satellite broadcast service from the call center.

4. The method of claim 1 wherein sending a request signal from the call center to the mobile vehicle comprises transmitting the request signal via a wireless carrier system.

5. The method of claim 1 wherein sending the authorization status to the satellite broadcast service from the call center comprises sending the authorization status from a telematics unit to the satellite broadcast service over a wireless carrier system.

6. The method of claim 5 wherein the wireless carrier system is an analog mobile telephone system.

7. The method of claim 5 wherein the wireless carrier system is a digital mobile telephone system.

8. The method of claim 1 wherein the call center is a telematics service call center.

9. A computer usable medium including a program for determining an authorization status of a satellite broadcast service for a mobile vehicle, comprising:
   computer program code to receive a request front the satellite broadcast service for the authorization status far the mobile vehicle at a call center;
   computer program code to send a request signal from the call center to the mobile vehicle;
   computer program code to receive an authorization status signal from the mobile vehicle at the call center; and
   computer program code to send the authorization status to the satellite broadcast service from the call center.

10. The computer usable medium of claim 9 wherein the authorization status represents the activation status of a satellite radio receiver in the mobile vehicle.

11. The computer usable medium of claim 9 further comprising:
   computer program code to append subscriber information to the authorization status that is sent to the satellite broadcast service from the call center.

12. A system of determining an authorization status of a satellite broadcast service for a mobile vehicle, comprising:
   means for receiving a request from the satellite broadcast service for the authorization status for the mobile vehicle at a call center;
   means for sending a request signal from the call center to the mobile vehicle;
   means for receiving an authorization status signal from the mobile vehicle at the call center; and
   means for sending the authorization status to the satellite broadcast service from the call center.

13. The system of claim 12 further comprising:
   means for appending subscriber information to the authorization status that is sent to the satellite broadcast service from the call center.

* * * * *